United States Patent [19]

Freese

[11] Patent Number: 5,158,685

[45] Date of Patent: * Oct. 27, 1992

[54] INHIBITION OF SILICA AND SILICATE DEPOSITION IN COOLING WATER SYSTEMS

[75] Inventor: Donald T. Freese, Glenside, Pa.

[73] Assignee: Betz Laboratories, Inc., Trevose, Pa.

[*] Notice: The portion of the term of this patent subsequent to Jan. 7, 2009 has been disclaimed.

[21] Appl. No.: 729,519

[22] Filed: Jul. 12, 1991

[51] Int. Cl.$^5$ ............................................. C02F 5/14
[52] U.S. Cl. .................................. 210/699; 210/701; 252/180; 252/181; 422/15; 422/17; 422/19
[58] Field of Search .................... 210/699–701; 252/180, 181, 389.54; 422/15, 17, 19

[56] References Cited

U.S. PATENT DOCUMENTS

| | | | |
|---|---|---|---|
| 3,578,589 | 5/1971 | Hwa et al. | 210/58 |
| 3,948,792 | 4/1976 | Watsen et al. | 252/181 |
| 4,783,267 | 11/1988 | Boffardi et al. | 210/699 |
| 4,869,845 | 9/1989 | Chen | 252/181 |
| 4,933,090 | 6/1990 | Gill et al. | 210/701 |
| 4,973,409 | 11/1990 | Cook | 210/699 |
| 5,034,155 | 7/1991 | Soeder et al. | 210/699 |
| 5,078,891 | 1/1992 | Sherwood et al. | 210/699 |

Primary Examiner—Peter Hruskoci
Attorney, Agent, or Firm—Alexander D. Ricci; Gregory M. Hill

[57] ABSTRACT

A method inhibiting the deposition of silica and silicate compounds on the metallic surfaces of cooling water equipment comprising adding to the water a composition consisting of hydroxyphosphonoacetic acid and a polymer having the formula:

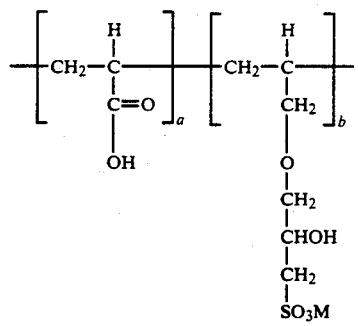

wherein M is a water soluble cation. This composition may further comprise a molybdate compound.

7 Claims, No Drawings

INHIBITION OF SILICA AND SILICATE DEPOSITION IN COOLING WATER SYSTEMS

FIELD OF THE INVENTION

The present invention relates to cooling and boiler water systems. The control of silica and silicate deposition within these systems is the focus of the invention disclosed hereinafter.

BACKGROUND OF THE INVENTION

The problems of scale formation and its attendant effects have troubled water systems for years. For instance, scale tends to accumulate on internal walls of various water systems, such as boiler and cooling systems, thereby reducing heat transfer properties and fluid flow through heat exchange tubes.

One particular type of deposit, silica, is especially troublesome in some systems. Where the water used in cooling systems and water-cooled industrial heat exchangers is taken directly from lakes, rivers, ponds or municipal water sources, various amounts of dissolved and suspended solids including silica are present. Problems are compounded in open recirculating water systems due to the fact that as water evaporates the silica concentration increases, thereby increasing both the occurrence and degree of deposition.

In cooling water systems, silica and silicate compounds form deposits on the internal metal surfaces in contact with the water flowing through the system. In this manner, heat transfer efficiency becomes severely impeded, which in turn has a deleterious effect on the overall operating efficiency of the cooling water system. Silica and silicate deposition also causes problems on other conduit and pipe surfaces as well as on equipment such as valves, nozzles and pumps.

Although current industrial cooling systems make use of sophisticated external treatments of the feedwater, e.g., coagulation, filtration, softening of water prior to its being fed into the water system, these operations are only moderately effective. In all cases, external treatment does not in itself provide adequate treatment since muds, sludge, silts and dissolved solids such as silica, escape the treatment, and eventually are introduced into the cooling system.

Various methods have been utilized for resolving the problem of sludge and silt, including silica, deposition. In U.S. Pat. No. 3,578,589, Hwa et al., inhibition of scale, mud, silt and sludge deposition is achieved by adding a nonionic surface active agent, such as a polyethyleneoxy alkyl phenol, and a water soluble polymer, such as polyacrylic acid.

In Watsen et al., U.S. Pat. No. 3,948,792, the patentees disclose the problem of silicate scale formation in automobile and diesel coolant systems. They teach adding a water soluble carboxylic acid polymer and nitrites along with either boric acid or borates.

U.S. Pat. No. 4,869,845, Chen, utilizes the same copolymer as utilized in the present invention to treat scale and corrosion problems in cooling and boiler water systems. The copolymer is added to the system with both a phosphonate and a zinc compound. The purpose of the copolymer is to maintain the solubility of zinc. Without this mechanism, the zinc would precipitate in the form of zinc hydroxide and would be unavailable for its desired anti-corrosion activity.

DETAILED DESCRIPTION OF THE INVENTION

In accordance with the invention, it has been discovered that a treatment program comprising water soluble copolymers as shown in Formula I hereinafter and hydroxyphosphonoacetic acid is effective in controlling the formation of silica and silicate deposits on the internal surfaces of structures housing cooling water systems.

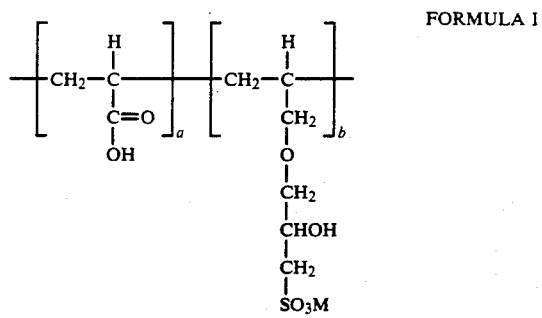

FORMULA I

M is a water soluble cation. This polymer is referred to as acrylic acid/allyl hydroxy propyl sulfonate ether (AA/AHPSE). The IUPAC nomenclature for AHPSE is 1-propane sulfonic acid 2-hydroxy-3-(2 propenyl-oxy) mono sodium salt.

The number average molecular weight of the water soluble copolymers of FORMULA I may fall within the range of 1,000 to 1,000,000. Preferably the number average molecular weight will be within the range of from about 1,500 to about 10,000. The key criterion is that the polymer be water soluble.

The molar ratio of repeat units a:b in FORMULA I may fall within the range of between about 30:1 to 1:20, with the a:b molar ratio range of from about 10:1 to 1:5 being preferred.

With respect to both repeat units of the polymers of the present invention, they may exist in acid or water soluble salt form when used in the desired water system.

As to preparation of the monomer designated as a above, in FORMULA I, acrylic acid is well known. It may be produced by hydrolysis of acrylonitrile or via oxidation of acrolein.

Turning to the allyl containing monomer, monomer b, in FORMULA I above, it may be produced by reacting allyl alcohol with a non-tertiary alcohol in the temperature range of about 25°-150° C. as detailed in U.S. Pat. No. 2,847,477 (the entire disclosure of which is hereby incorporated by reference) followed by, if desired, sulfonation, phosphorylation, phosphonation or carboxylation of the monomer via well-known techniques.

The preferred allyl hydroxyl propyl sulfonate ether monomers (monomer b, FORMULA I) may conveniently be prepared via a ring opening reaction of the epoxy group of an allyl glycidyl ether precursor. Sulfonation of the epoxy group with sodium sulfite in the presence of a phase transfer catalyst such as tetra-n-butyl ammonium bisulfite or with fuming sulfuric acid containing sulfur trioxide will produce the sulfonic acid group and hydroxy group of the AHPSE. The resulting monomer can be further neutralized with caustic or other basic material. The reaction is illustrated by the following mechanism:

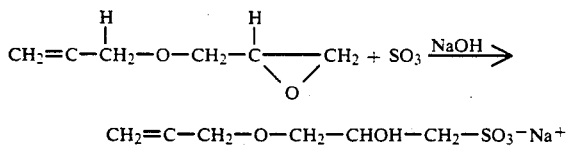

$$CH_2=C-CH_2-O-CH_2-CHOH-CH_2-SO_3^-Na^+$$

It should be noted that monomer b may itself be allyl glycidyl ether which is available from several commercial sources. Suitable cations, M, include Na+, Ca+2 and K+.

After the desired monomers have been obtained, free radical chain addition polymerization may proceed in accordance with conventional solution polymerization techniques. Polymerization initiators such as persulfate initiators, peroxide initiators, etc. may be used. Preferably the requisite monomers are mixed with water and alcohol (preferably isopropanol). The resulting polymer may be isolated by well-known methods such as distillation, etc., or the polymer may simply be used in its aqueous solution.

The treatment program of the present invention comprises adding the copolymer (AA/AHPSE) previously described along with hydroxyphosphonoacetic acid (Belcor 575 available from Ciba-Geigy) to the aqueous system to be treated. These compounds are added in an effective amount for the purpose of inhibiting silica and silicate deposition. The amount of AA/AHPSE added should be sufficient to maintain a concentration of from 10 to 100 ppm (active). The hydroxyphosphonoacetic acid is added in an amount sufficient to maintain a concentration of from 3 to 20 ppm (active).

The relative component concentrations will vary depending upon the particular aqueous system to which the treatment is directed. Factors influencing dosages are the surface area of the heat exchange surfaces, pH, temperature, water flow rate and concentrations of potential deposit forming species.

With such wide variances in the chemistry of makeup water, some systems are more difficult to treat than others. It has been discovered that the addition of a molybdate compound to the aforementioned treatment program provides the necessary efficacy, to inhibit silica and silicate deposition in these systems. The molybdenum may be added in any suitable form, such as its oxides. Preferably, $MoO_4^{2-}$ is utilized and would be added to the aqueous systems in a sufficient amount so as to maintain a concentration of from about 10 to 50 ppm as $MoO_4$.

The treatment of the present invention may be added to the aqueous system to be treated either on a continuous basis or intermittently. The separate compounds comprising the treatment program may be preblended prior to addition to the aqueous system or each compound may be added separately according to a predetermined dosage for the purpose of achieving the desired concentration level of the treatment compounds in the aqueous system. When pre-blended, the composition would be comprised of the following hydroxyphosphonoacetic acid: polymer: Molybdate (as $MoO_4$) weight ratio—6:30:20.

EXAMPLES

Recirculator tests are used to simulate heat transfer conditions in cooling systems. The recirculator test units have been used to demonstrate the inhibition of silica and silicate deposits. These units have a volume of approximately 11 liters and utilize a pump to generate water flow past the outside of a metal tube that contains a heater. The units have a temperature control device to maintain a desired sump temperature. The pH is maintained by the controlled addition of $CO_2$ to the system. The units are capable of being operated in either an evaporative or non-evaporative mode.

In the evaporative mode, the sump is charged with a specific water and a dilute water is fed to maintain the specific water composition. The dilute makeup maintains the system volume and compensates for evaporation and selected blowdown rates. The system volume is maintained by a level controller and a blowdown pump. In the non-evaporative mode, two makeup solutions are fed simultaneously to the units to maintain the specified water composition. The system volume is controlled by an overflow port. One makeup solution contains calcium chloride and magnesium sulfate and the other makeup solution contains sodium bicarbonate and sodium silicate.

In the evaporative mode, silica deposition was evaluated using water having the following composition:

1820 ppm Ca as $CaCO_3$
840 ppm Mg as $CaCO_3$
3670 ppm $SO_4$
1290 ppm Cl
1597 ppm Na
250 ppm $SiO_2$
500 ppm M alkalinity The physical characteristics of the recirculator test units used in this evaluation were as follows:

pH 8.2
120° F. sump temperature
308 watts on the heater (@13,000 BTU/hr/ft² heat flux)
2.8 ft/sec water velocity past the heated tubes mild steel coupons and heater tubes Table I shows the results of an evaluation of the treatment program according to the present invention under the above noted test conditions. The value of hydroxyphosphonoacetic acid is apparent since a comparative test was conducted using, in its place, 1-hydroxyethylidene-1,1-diphosphonic acid (HEDP, Dequest 2010). Tolyltriazole was added in these tests because tolyltriazole is typically used to prevent copper and brass corrosion in cooling systems.

TABLE I

| | Evaporative Recirculator Test | | |
|---|---|---|---|
| | Concentration | Results | |
| Composition | (active) | Tube | Coupons |
| hydroxyphosphono-acetic acid | 6 ppm | no deposition | no deposition |
| polymer* | 30 ppm | | |
| tolyltriazole | 3 ppm | | |
| HEDP | 6 ppm | deposition | deposition |
| polymer* | 30 ppm | | |
| tolyltriazole | 3 ppm | | |

*polymer: acrylic acid/AHPSE, 3/1 mole ratio MW @ 8,000.

The tube and coupon for the HEDP composition test were analyzed by Fourier Transform Infrared Analysis (Diffuse Reflectance.) The coupon was also analyzed by Scanning Auger Microscopy (SAM). The infrared analysis showed a large peak at 1067 cm$^{-1}$ with small peaks at 1636, 1558 and 1420 cm$^{-1}$ for the coupon deposit.

The infrared analysis showed a large peak at 1084 cm$^{-1}$ with minor peaks at 1650 cm$^{-1}$ and 799 cm$^{-1}$ for the tube deposit. The SAM analysis showed the following atomic concentrations: 38.43% C, 32.41% O, 11.21% Si, 8.42% Ca, 4.78% Mg, 2.89% Fe, 1.13% Na, 0.52% S and 0.21% Cl. No phosphorus was detected. Another location on the coupon was detected to contain 23% Si. The infrared and SAM analysis showed that the deposit was a silicate with some silica. Since silica and silicate are supersaturated in the test water it would be expected that they would deposit on heat transfer surfaces and coupons under the above test conditions. Such was the case with the HEDP treatment sample. However, the sample with the hydroxyphosphonoacetic acid exhibited no deposition in contrast to what would have been expected.

Studies with different test waters show that the ability of hydroxyphosphonoacetic acid and polymer to inhibit silica and silicate deposits can be improved by the addition of molybdate. In non-evaporative recirculator units, tests were conducted with the following water conditions:

600 ppm Ca as $CaCO_3$
200 ppm Mg as $CaCO_3$
426 ppm Cl
192 ppm $SO_4$
500 ppm M alkalinity
100 ppm $SiO_2$.

Physical characteristics of the test units were as follows:

pH 9.0
120° F. sump temperature
308 watts on the heater (@13,000 $BTU/hr/ft^2$ heat flux) mild steel heater tubes and coupons Table II shows the results of testing under the above conditions comparing a silica deposition treatment without molybdenum to one with molybdenum.

TABLE II

Silica Deposition Inhibition w/Molybdate

| Treatment Composition | Concentration (active) | Results Tube | Results Coupons |
|---|---|---|---|
| hydroxyphosphonoacetic acid | 12 ppm | deposit | deposit |
| polymer* | 50 ppm | | |
| hydroxyphosphonoacetic acid | 12 ppm | no deposit | slight deposit on edges |
| polymer* | 50 ppm | | |
| $MoO_4$ | 20 ppm | | |

*polymer: AA/AHPSE, 6/1 mole ratio, Mw @ 8,000.

In order to verify the composition of the deposits, the first of the above tests was repeated under the same conditions except that silica was absent from the water. In this case, no deposition developed on the tubes or coupons.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim

1. A method of inhibiting the deposition of silica and silicate compounds on the metal surfaces in contact with water in a cooling water system comprising adding to the water from 3 to 20 ppm of hydroxyphosphonoacetic acid, from 10 to 100 ppm of a water soluble polymer having the formula:

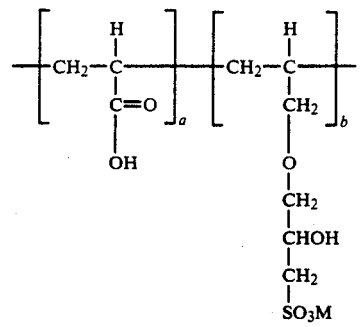

wherein M is a water soluble cation and the molar ratio of a:b is from about 30:1 to 1:20, and an effective amount of tolyltriazole to prevent corrosion in said cooling water systems.

2. The method of claim 1 wherein M is selected from the group consisting of $Na^+$, $NH_4^+$, $Ca^{+2}$ and $K^+$.

3. The method of claim 1 wherein the molar ratio of a:b is from about 10:1 to 1:5.

4. A method of inhibiting the deposition of silica and silicate compounds on the metal surfaces in contact with water in a cooling water system comprising adding to the water from 3 to 20 ppm of hydroxyphosphonoacetic acid, from 10 to 50 ppm of molybdate and from 10 to 100 ppm of a water soluble polymer having the formula:

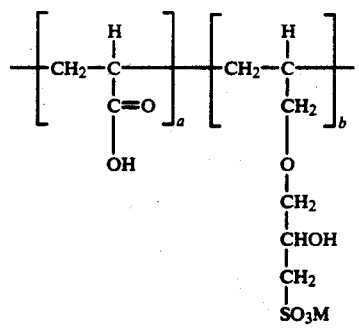

wherein M is a water soluble cation and the molar ratio of a:b is from about 30:1 to 1:20.

5. The method of claim 4, wherein the molybdate is $MoO_4^{2-}$.

6. The method of claim 4, wherein M is selected from the group consisting of $Na^+$, $NH_4^+$, $Ca^{+2}$ and $K^+$.

7. The method of claim 4, wherein the molar ratio of a:b is from about 10:1 to 1:5.

* * * * *